(12) United States Patent
Bayer

(10) Patent No.: US 6,666,197 B2
(45) Date of Patent: Dec. 23, 2003

(54) PROCESS AND DEVICE FOR CONTROLLING CYLINDER SELECTIVE FILLING IN A COMBUSTION ENGINE HAVING A VARIABLE OPERATION

(75) Inventor: Michael Bayer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 210 days.

(21) Appl. No.: 09/953,973

(22) Filed: Sep. 18, 2001

(65) Prior Publication Data
US 2002/0033151 A1 Mar. 21, 2002

(30) Foreign Application Priority Data
Sep. 19, 2000 (DE) .......................................... 100 46 221

(51) Int. Cl.$^7$ .................................................. F01L 1/34
(52) U.S. Cl. ................... 123/672; 123/434; 123/90.18; 701/103
(58) Field of Search .......................... 123/90.11, 90.15, 123/90.18, 568.14, 672, 434; 701/103

(56) References Cited

U.S. PATENT DOCUMENTS 6,397,802 B1 * 6/2002 Rutschmann et al. .... 123/90.15
2002/0166539 A1 * 11/2002 Gaessler et al. ............ 123/404
2002/0189581 A1 * 12/2002 Gaessler et al. ............ 123/295
2003/0000488 A1 * 1/2003 Burgdorf et al. ......... 123/90.13

FOREIGN PATENT DOCUMENTS

| DE | 4024369 | 2/1992 |
| DE | 19859018 | 6/2000 |
| EP | 0833043 | 7/1997 |
| WO | 19906707 | 8/2000 |

OTHER PUBLICATIONS

Search Report.

* cited by examiner

Primary Examiner—Henry C. Yuen
Assistant Examiner—Hai Huynh
(74) Attorney, Agent, or Firm—Crowell & Moring LLP

(57) ABSTRACT

A process and a device for controlling selective cylinder filling in combustion engines with a variable valve drive, where the valve stroke and/or the valve opening and closing times of the cylinder intake valves are controllable. In order to ensure satisfactory idling quality also in direct fuel-injection engines in spite of the occurring production tolerances, at least one input magnitude is determined on whose basis conclusions can be drawn as to the filling level or filling level differences of each cylinder. From this input magnitude, a control signal for the variable valve operation is determined such that differing filling levels of the cylinder can be balanced out by adjusting the valve drive.

12 Claims, 1 Drawing Sheet

PROCESS AND DEVICE FOR CONTROLLING CYLINDER SELECTIVE FILLING IN A COMBUSTION ENGINE HAVING A VARIABLE OPERATION

BACKGROUND AND SUMMARY OF THE INVENTION

This application claims the priority of German patent document 100 46 221.9, filed Sep. 19, 2000, the disclosure of which is expressly incorporated by reference herein.

This invention relates to a process and a device for the control of selective cylinder filling in combustion engines with variable valve operation where the valve closing and opening times of the cylinder intake valves are controllable.

Variable valve drives in combustion motors are generally known. An eccentric shaft is mostly adjusted to control the stroke height of the intake valves. To adjust the eccentric shaft, an electric motor is often used; but a hydraulic system or other systems for adjusting the eccentric shaft or similar valve drive adjusting systems can also be used.

Depending on the system for a valve drive, there are production tolerances, for example, in the case of the valve head, in a roll drag lever, in an intermediate lever or in the eccentric shaft itself. These production tolerances lead to differences in filling the individual cylinders. This results in a "rough running" of the motor, especially during idle running. In the case of direct-injection engines, this can lead to the run limit being reached, at which there is no further combustion in the cylinder.

A perceptible rough running in a vehicle, however, as a rule, is not tolerable. Therefore, attempts have been made to achieve uniform filling distribution within a range of +/−10 percent by compressing the production tolerances. That range mostly represents an acceptable filling difference. Minimizing the production tolerances, however, is very expensive. By way of example, the individual components must be measured. In the extreme case, it may even be necessary to dismantle a cylinder head with the subsequent follow-up work.

The object of the invention is, in combustion engines with variable valve operation, to achieve satisfactory idling comfort or adequate quiet running at low rpms even with standard production tolerances.

This problem is solved by the process and apparatus for controlling cylinder selective filling in a combustion engine with a variable valve drive, where the valve stroke and/or the valve closing and opening times of the cylinder intake valves are controllable. At least one input magnitude is determined. Based on the input magnitude a conclusion is drawn as to the filling or filling differences of the cylinder. From this input magnitude, a control signal is determined for the variable drive in such a way that any different fillings of the cylinder are balanced out by adjusting the valve drive.

A basic feature behind certain preferred embodiments of the invention involves the use of the variable valve drive to balance out any differences in the cylinder filling. To recognize any differing cylinder filling, either rough running magnitudes (for example, number of revolutions, torque), valve stroke magnitudes (for example, direct-valve stroke) or other magnitudes that point to differing filling conditions (for example, lambda signal) are used. On the basis of these input magnitudes, a control magnitude is generated in a control device. By using the control magnitude, an actuator of the valve drive is impacted so that during the time between fillings of the cylinders to be filled in succession, a different adjustment can be brought about on the valve drive, for example, in the eccentric shaft. By selective cylinder adjustment of the eccentric shaft, especially in the idling range, the valve lifting curves can be changed so that a filling difference caused in itself by production tolerances can be balanced out.

When several intake valves per cylinder are used, then one can also average via these valves. This is particularly advantageous when the valve stroke or the opening time of a valve is used as the input magnitude.

Other objects, advantages and novel features of the present invention will become apparent from the following detailed description of the invention when considered in conjunction with the accompanying drawings.

DETAILED DESCRIPTION OF THE DRAWINGS

Figure 3:
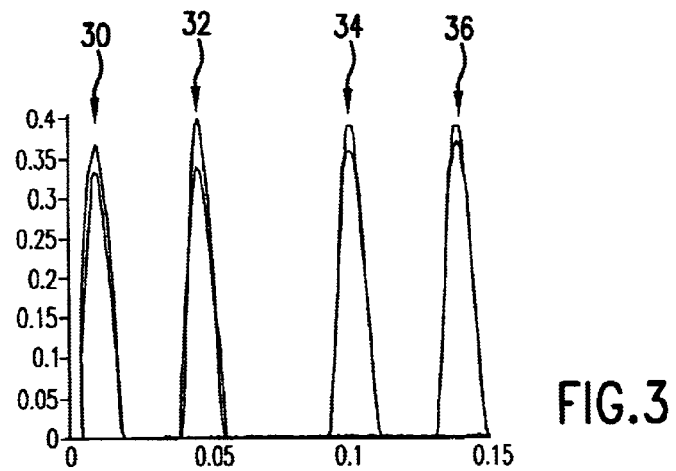
FIG. 3 is a diagram showing the valve strokes of four cylinders.

Referring to FIG. 3, curves 30 to 36 illustrate stroke values over time for two intake valves associated with each of four cylinders in an engine. In other words, curves 30 indicate the stroke curve of two intake valves in cylinder 1, curves 32 show the stroke curve of two intake valves for cylinder 2, and curves 34 and 36 show the stroke curves of two intake valves for cylinders 3 and 4 of a combustion engine, respectively.

It can be seen in FIG. 3 that the two intake valves of cylinder 1 are not opened equally (curves 30), such as is the case for the two intake valves of cylinder 4 (curves 36). Both during the evaluation of the cylinder filling via arithmetic competitions of the maximum values of both curves or via an integral of the valve opening times, it is ascertained that cylinder 1 is filled less than cylinder 4. This is due to the production tolerances and is why an intolerable rough running situation occurs while idling.

Figure 1:
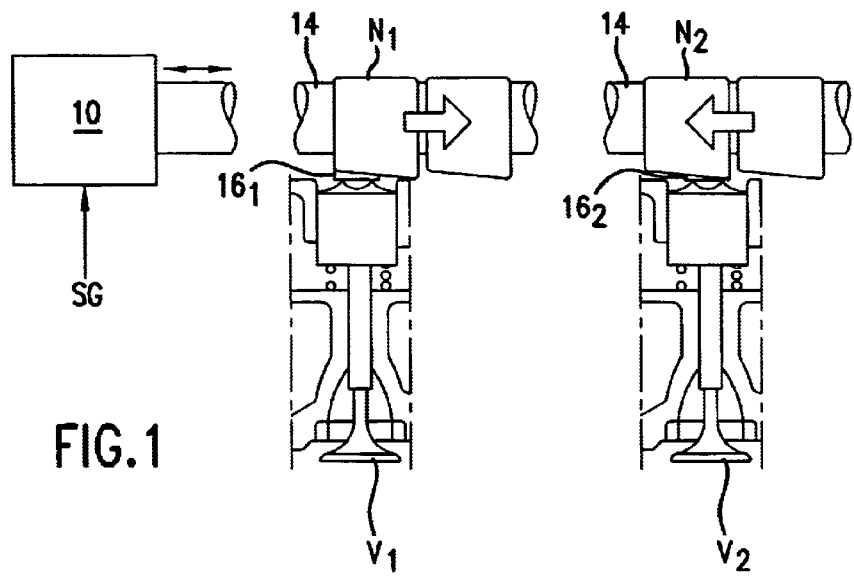
FIG. 1 is a diagram illustrating a variable valve drive with an actuator according to the invention.

According to the present invention, the variable valve drive in a combustion engine is used to balance this problem out. An embodiment of such a valve drive is illustrated in FIG. 1. However, it must be pointed out that a wide variety of embodiments are known for variable valve drives and that the invention can be generally applied to any known or equivalent variable valve drives.

The exemplary embodiment, illustrated in FIG. 1, shows a camshaft 14 having a cam $N_1$, $N_2$ for each intake valve. The cams have a conical shape oriented roughly in the axial direction. The camshaft 14 is movable by an actuator 10, in this case an electric motor that can shift the camshaft 19 in the axial direction. By shifting the camshaft in the axial direction, the two valves $V_1$, $V_2$, which in this case belong to two different cylinders, are opened to different widths via cam bearing $16_1$ and $16_2$.

To clarify the operating procedure, the two cams $N_1$ and $N_2$ are adjusted differently. Normally, these two cams $N_1$ and $N_2$ are coupled via camshaft 14. Cam $N_1$ is in its position wherein it is shifted to the right the maximum amount, as a result of which, valve bearing $16_1$ moves on a circumferential line having a smaller average diameter. Valve $V_1$ therefore is generally not opened so wide. Cam $N_2$, on the other hand, is shifted to the left in its maximum position so that the average diameter of the circumferential line is larger and valve V₂ is generally opened more widely. By correspondingly shifting camshaft 14 via actuator 10, which gets a control signal SG from a control unit, one can thus also regulate the filling for the individual cylinders via the opening dimension of the individual valves. This operation is now used in the invention at hand.

Figure 2:
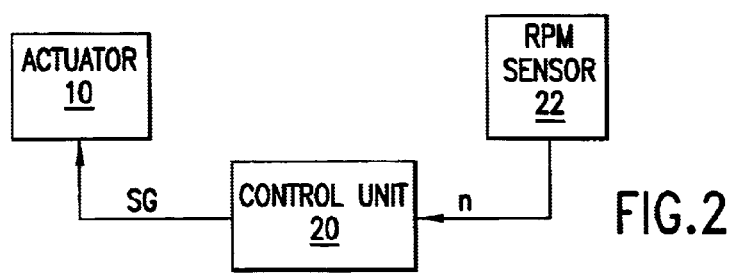
FIG. 2 is a block diagram of an embodiment of the present invention.

An embodiment of the invention is illustrated in FIG. 2 in the form of a simple block diagram. According to FIG. 2, an rpm sensor 22 is provided, which transmits an rpm signal n to the control unit 20. From the rpm signal n, control unit 20, on the basis of the determined rough running, generates a control signal SG that is supplied to the actuator. The control signal is fashioned so that the actuator 10 is adjusted in the direction toward the greater cylinder stroke in the case of a cylinder where a lesser filling level has been determined. In the case of a cylinder that is found to have excessive filling, the actuator is adjusted in the direction toward a smaller cylinder stroke. Assuming appropriate use, the valve heights for each cylinder can then be controlled so that one can ensure uniform filling. For this to occur, actuator 10 must have adjusted the variable valve drive accordingly between two, each, fillings of cylinders to be filled in succession.

The important thing here is that the adjustment must occur during the remaining time. This is why the adjustment for each cylinder is meaningful only when the engine is operated at low rpm. But it is precisely at low rpms that there occurs a significant impairment of the rough-running condition due to production tolerances. Great durability must be emphasized because the actuator is continually operated due to the permanent adjustment.

The invention at hand ensures uniform filling without any additional effort in terms of design and production; one can also attain a sufficient idling quality below the momentary idling rpm. Furthermore, such a process and such a device can also be used adaptively in such a way that any later wear-and-tear effects of valves can be balanced out.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for controlling cylinder selective filling in a combustion engine having a variable valve drive, wherein at least one of a valve stroke and valve closing and opening times of cylinder intake valves are controllable, the method comprising the acts of:
   determining at least one input magnitude of the engine;
   drawing a conclusion as to the filling or filling differences of cylinders based on the determined input magnitude;
   determining from the conclusion based on the input magnitude a control signal for adjusting the variable valve drive in order to balance out filling differences of the cylinders.

2. The process according to claim 1, wherein valve adjustment in order to equalize the fillings is carried out in an idling rpm range.

3. The process claim 2, wherein said input magnitude is at least one of:
   an engine rpm, an engine torque, a lambda probe signal value, a direct valve stroke value, and a particular magnitude corresponding to a valve stroke.

4. The process according to claim 2, wherein for several intake valves per cylinder, the process averages the fillings over the valves.

5. The process claim 1, wherein said input magnitude is at least one of:
   an engine rpm, an engine torque, a lambda probe signal value, a direct valve stroke value, and a particular magnitude corresponding to a valve stroke.

6. The process according to claim 5, wherein for several intake valves per cylinder, the process averages the fillings over the valves.

7. The process according to claim 1, wherein for several intake valves per cylinder, the process averages the fillings over the valves.

8. A device for controlling selective cylinder filling in a combustion engine having a variable valve drive, the device comprising:
   an actuator coupled to the variable valve drive for adjusting at least one of a valve stroke and closing and opening times of cylinder intake valves;
   at least one sensor providing an input magnitude based upon which a conclusion can be made as to a filling of each cylinder;
   a control device receiving the input magnitude as an input, said control device determining a control signal that is output to the actuator based on the input magnitude, said control signal causing the actuator to adjust the variable valve drive to balance out any different filling levels of the cylinders.

9. The device according to claim 8, wherein said sensor is at least one of an rpm sensor, a torque sensor, a lambda probe, and valve stroke sensors.

10. The device according to claim 8, wherein said control device receives as the input magnitude an rpm signal, and wherein the filling level is adjusted only when the rpm signal is in an idling rpm range.

11. The device according to claim 9, wherein said control device receives as the input magnitude an rpm signal, and wherein the filling level is adjusted only when the rpm signal is in an idling rpm range.

12. A computer product, comprising a computer readable medium having stored thereon program code segments that:
   receive an input magnitude value for an engine of a vehicle having a variable valve drive;
   predict filling differences of cylinders of the engine based upon the input magnitude;
   calculate a control signal for adjusting the variable valve drive to balance out any different filling levels of the cylinders.

* * * * *